(12) United States Patent
van Diggelen et al.

(10) Patent No.: US 9,562,976 B2
(45) Date of Patent: Feb. 7, 2017

(54) METHOD AND APPARATUS FOR DISTINGUISHING DIRECT GNSS SIGNALS FROM REFLECTIONS

(71) Applicant: Broadcom Corporation, Irvine, CA (US)

(72) Inventors: Frank van Diggelen, San Jose, CA (US); Stephen Mole, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 601 days.

(21) Appl. No.: 14/039,496

(22) Filed: Sep. 27, 2013

(65) Prior Publication Data

US 2015/0035700 A1 Feb. 5, 2015

Related U.S. Application Data

(60) Provisional application No. 61/860,675, filed on Jul. 31, 2013.

(51) Int. Cl.
*G01S 19/42* (2010.01)
*G01S 19/22* (2010.01)

(52) U.S. Cl.
CPC .............. *G01S 19/428* (2013.01); *G01S 19/22* (2013.01)

(58) Field of Classification Search
CPC ............................... G01S 19/428; G01S 19/22
See application file for complete search history.

(56) References Cited

U.S. PATENT DOCUMENTS

2010/0176992 A1* 7/2010 T'siobbel ................ G01S 19/22
342/357.25

FOREIGN PATENT DOCUMENTS

JP 61284687 A * 12/1986

* cited by examiner

*Primary Examiner* — Cassie Galt
(74) *Attorney, Agent, or Firm* — Sterne, Kessler, Goldstein & Fox PLLC

(57) ABSTRACT

A global navigation satellite system (GNSS) enabled device that is configured to distinguish reflected GNSS signals from direct GNSS signals utilizing three-dimensional models of the terrain in the proximity of the GNSS enabled device. By utilizing the identification of reflected GNSS signals, the reflected GNSS signals can be excluded and/or weighted to achieve a more accurate location determination.

20 Claims, 6 Drawing Sheets

METHOD AND APPARATUS FOR DISTINGUISHING DIRECT GNSS SIGNALS FROM REFLECTIONS

CROSS REFERENCE TO RELATED APPLICATIONS

This patent application claims the benefit of U.S. Provisional Patent Application No. 61/860,675, filed Jul. 31, 2013, entitled "METHOD AND APPARATUS FOR DISTINGUISHING DIRECT GNSS SIGNALS FROM REFLECTIONS," which is incorporated herein by reference in its entirety.

FIELD

This application relates generally to global navigation satellite systems (GNSS), and more particularly to distinguishing direct GNSS signals from reflected GNSS signals in GNSS communication environments.

RELATED ART

The Global Positioning System (GPS) is a global navigation satellite systems (GNSS) that provides location and time information to receivers on Earth. Other countries have implemented or are planning to implement similar systems, including the Russian Global Navigation Satellite System (GLONASS), the European Union Galileo positioning system (GALILEO), the Japanese Quasi-Zenith Satellite System (QZSS), the Chinese BeiDou navigation system, and the Indian Regional Navigational Satellite System (IRNSS) to provide some examples. There also are augmentation systems, such as the Space Based Augmentation System (SBAS), that include satellites configured to send integrity and correction information that can be used to improve the reliability and accuracy of the aforementioned Global Navigation Satellite Systems. Some SBAS satellites also can be used as navigation satellites in their own right.

GNSS systems use radio signals transmitted by orbiting satellites to determine precise ground locations, enabling advanced navigation and location-based services. Typically, a GNSS receiver determines its position based on the timing of messages received from at least four GNSS satellites. Each message specifies the time of transmission and the position of the satellite at the time of transmission. The receiver can compute the time of transit for each received message and, using navigation equations, its location. The location can then be displayed, e.g., on an electronic map, or provided to another application. In some implementations, fewer than four satellites can be used to determine location. For example, if a stored or estimated position or elevation is used, the location, can be determined using signals from only three satellites.

Using satellite signals to perform a location determination can be time consuming, A stand-alone GPS receiver often requires up to 40 seconds to compute an initial position. Accordingly, assisted GPS ("A-GPS") can be used to reduce the time-to-first-fix. The user equipment, such as a mobile phone, can obtain data from an A-GPS server. Available assistance data includes orbital data for GPS satellites; this assistance data can reduce the time required to lock onto signals and decode the data broadcast by the satellites, such as precise time data. Further, the user equipment can provide partial information to an A-GPS server, which can then calculate the location for the user equipment. This has the added benefit of reducing the workload of the user equipment.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 1:
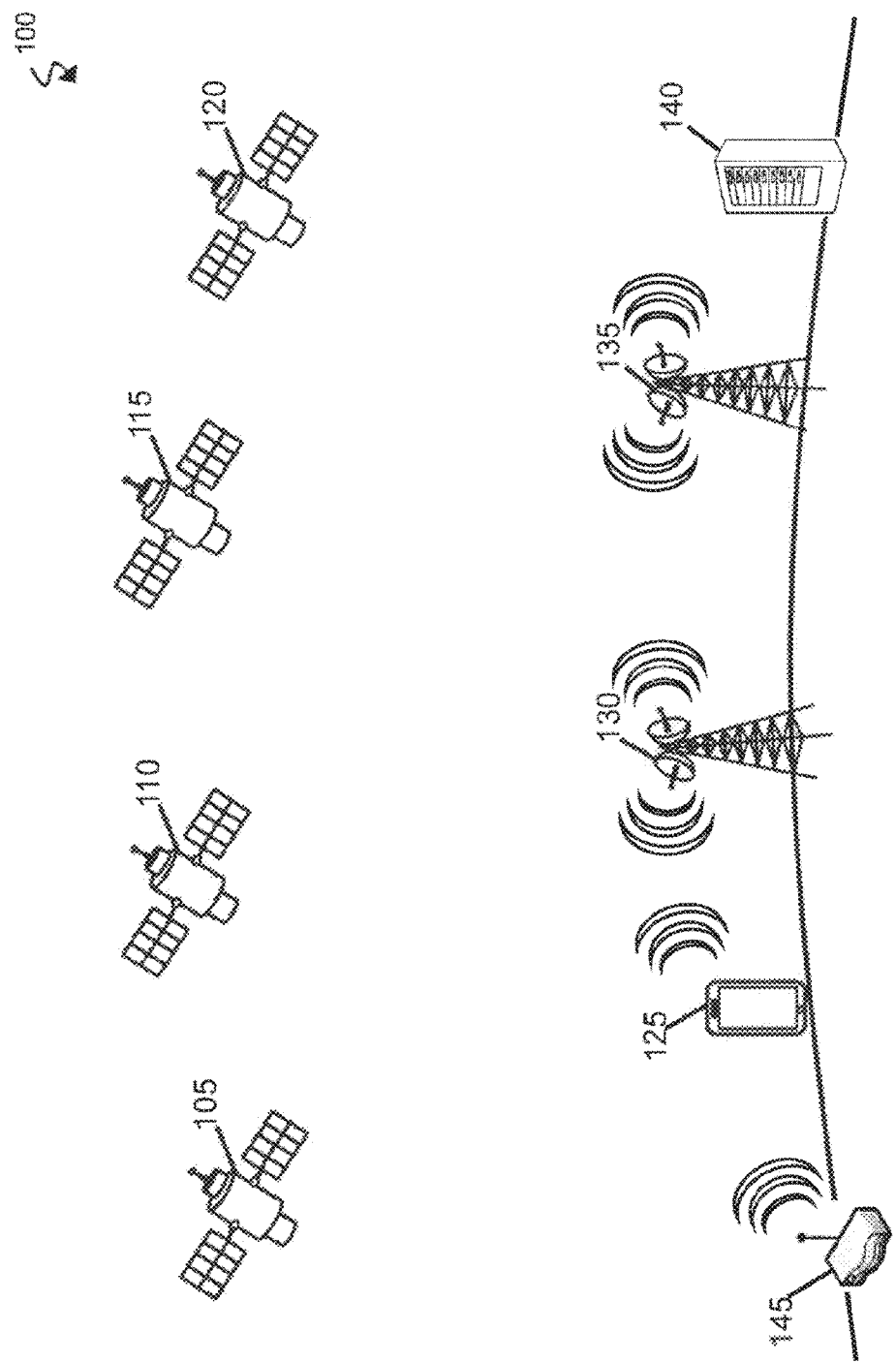
FIG. 1 illustrates a satellite positioning system in accordance with exemplary embodiments of the present disclosure.

The embodiments of the present disclosure will be described with reference to the accompanying drawings. The drawing in which an element first appears is typically indicated by the leftmost digit(s) in the corresponding reference number. Further, reference numbers that include rightmost alphabetic characters or subscripted numerals typically indicate two or more similar elements that share common features.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others Skilled in the art. In other instances, well-known methods, procedures, components, and circuitry have not been described in detail to avoid unnecessarily obscuring aspects of the disclosure.

In various exemplary embodiments of the present disclosure, a GNSS receiver is configured to receive GNSS signals from one or more visible orbiting satellites. For the purpose of this disclosure, the term visible indicates that the GNSS receiver is able to receive GNSS signals from a particular orbiting satellite of sufficient magnitude to be utilized in position and navigational determinations (i.e., the orbiting satellite is a visible satellite). The term non-visible indicates that the GNSS receiver does not receive GNSS signals from a particular orbiting satellite of sufficient magnitude to be utilized in position and navigational determinations (i.e., the orbiting satellite is a non-visible satellite). Characteristics of the terrain can result in one or more orbiting satellites becoming non-visible satellites. For example, one or more buildings can block or attenuate GNSS signals from one or more orbiting satellites so as to cause the one or more satellites to become non-visible.

As discussed in more detail below with reference to FIGS. 2-4, GNSS signals received from visible orbiting satellites can be from one or more satellites with a direct line of sight to the GNSS enabled device (e.g., GNSS signals 420 of FIG. 4). These GNSS signals can be referred to as direct GNSS signals. Alternatively, the GNSS enabled device can receive GNSS signals from one or more visible orbiting satellites not within the direct line of sight of the GNSS enabled device that have been reflected by the terrain (e.g., buildings, trees, geography, and/or any other obstructions) before reaching the GNSS enabled device (e.g. GNSS signals 410 of FIG. 4). These GNSS signals can be referred to as reflected GNSS signals because such signals are not received from one or more orbiting satellites within direct line of sight of the GNSS enabled device but are of sufficient magnitude to be utilized in position and navigational determinations (e.g., the GNSS signals are partially obstructed). Although reflected GNSS sign als can be used in position and navigational determinations, the reflected GNSS signals introduce inaccuracies in the position and navigational determinations due to the extra path length of the reflected GNSS signals, which causes timing errors in the GNSS calculations. Blocked GNSS signals are GNSS signals that are not received by the GNSS enabled device and/or are signals that have been received by the GNSS enabled device but are of insufficient magnitude and/or power level to be utilized in position and navigational determinations (e.g., the GNSS signals are completely obstructed such that the GNSS signals are not received by the GNSS enabled device or the GNSS signals are received but substantially obstructed such that they are of insufficient magnitude and/or power levels to be used in position and navigational determinations).

Further, as discussed in more detail below, the GNSS receiver can be configured to differentiate direct GNSS signals from reflected GNSS signals utilizing three-dimensional (3D) models of the terrain at the location of, and/or in the proximity of, the GNSS receiver.

Exemplary Satellite System

FIG. 1 illustrates an exemplary satellite positioning system 100 according to an exemplary embodiment of the present disclosure. The satellite position system 100 includes a user device 125 having suitable logic, circuitry, and/or code that is configured to determine its location in response to signals from one or more sources. The user device 125 can be any electronic device that includes or interfaces with a GNSS receiver. For example, the user device 125 can represent a mobile communication device, such as a cellular telephone or a smartphone; a mobile computing device, such as a tablet computer, laptop computer or personal digital assistant (PDA); a mobile sensing device having one or more sensors and/or communication modules, such as a mobile navigation device; a mobile electronic device, such as a camera, gaming device, media player, or watch; one or more sensors, processors, and/or communication modules integrated within a vehicle, aircraft, boat, or the like, such as a beads-up display, integrated navigation terminal, or the like; or any other electronic device that is configured to determine its location in response to signals from one or more sources as will be apparent to those skilled in the relevant art(s) without departing from the spirit and scope of the present disclosure.

In some implementations, the user device 125 can determine its position with respect to any or all of latitude, longitude, and altitude. In some other implementations, one or more other coordinate systems or positional representations can be used in addition to or in place of any or all of latitude, longitude, and altitude.

The satellite positioning system 100 also includes multiple positioning satellites (e.g., positioning satellites 105, 110, 115, and 120). In some implementations, all of the positioning satellites can be associated with a single positioning system, such as Naystar GPS, Global Navigation Satellite System (GLONASS), and the GALILEO global navigation system to provide some examples. In other implementations, one or more of the positioning satellites (e.g., positioning satellites 105 and 110), can be associated with one positioning system, such as Navstar GPS, while one or more of the positioning satellites (e.g., positioning satellites 115 and 120), can be associated with another positioning system, such as GLONASS or GALILEO. Using satellites associated with multiple positioning systems can permit operation or improve performance in areas where unobstructed signals from a sufficient number of positioning satellites associated with a single system may be difficult or impossible to obtain, such as urban areas and indoor environments.

The user device 125 is configured to receive signals from positioning satellites in the satellite positioning system 100 and to use received signals in performing a position determination. For example, the user device 125 can estimate its position using measurements of its range from a number of the positioning satellites. The user device 125 can be configured to extract broadcast ephemeris data from the received signals. The ephemeris data includes navigational information of the positioning satellites, where the navigational information includes satellite orbit models, clock models, and/or information about the operational status of the positioning satellites. The navigational information may be utilized in determining, for example, a position fix and/or the velocity of the user device 125. The broadcast ephemeris is typically valid for a limited period of time (e.g., two to four hours from the time of broadcast). Before the end of the period of validity, the user device 125 obtains a fresh broadcast ephemeris to continue operating to produce an accurate position fix and/or velocity of the user device 125. The range between the user device 125 and the transmitting positioning satellite can be measured based on the time it takes the message to travel from the positioning satellite to the user device 125.

It can take a significant amount of time (e.g., up to 40 seconds) for the user device 125 to receive, from the satellites, the data required to determine the satellites' positions, and, in turn, to determine the position of the user device 125. In some implementations, the user device 125 can communicate with an Assisted OPS (A-GPS) server 140 to reduce the time required to determine a position, to reduce the amount of processing required to be performed by the user device 125, or both. The user device 125 can communicate with the A-GPS server 140 utilizing one or more communication standards or protocols, including various cellular communication standards such as a third Generation Partnership Project (3GPP) Long Term Evolution (LTE) communications standard, a fourth generation (4G) mobile communications standard, or a third generation (3G) mobile communications standard, various networking protocols such a Worldwide Interoperability for Microwave Access (WiMAX) communications standard or a Wi-Fi communication standard (e.g., over a wireless local area network WLAN), various NFC/RFID communications protocols such as ISO 1422, ISO/IEC 14443, ISO/IEC 15693, ISO/

IEC 18000, or FeliCa to provide some examples. Each of the above communication standards and protocols is incorporated herein by reference in its entirety.

A-GPS server 140 can store information associated with positioning satellites, such as orbital information, which can be downloaded by the user device 125. The user device 125 can use the information provided by the A-GPS server to reduce the time required to determine its location. For example, the user device can determine one or more satellite locations from the A-GPS data, instead of waiting to decode similar data received from satellites. Also, the A-GPS data can assist signal processing algorithms by reducing the search time to obtain a satellite signal. Further, the user device 125 can upload information, e.g., satellite signal time of arrival information, to the A-GPS server 140 for processing and can receive a position determination in response. Additionally, A-GPS server 140 can enable the user device 125 to operate in urban and indoor environments where traditional satellite-based positioning may fail, e.g., because signals cannot be acquired from a sufficient number of positioning satellites.

A-GPS information is typically accurate for a relatively short duration, such as four hours. However, long-term orbit (LTO) data also can be obtained from a network (e.g., from A-GPS server 140). LTO data provides user device 125 with positioning satellite orbit data that is accurate for a longer period of time (e.g., seven or more days). Accordingly, LTO data can provide similar benefits to A-GPS in the absence of data network availability, as long as a network was previously available within in the preceding days.

In some implementations, one or more wireless communication towers (e.g., cell towers 130 and 135), can assist user device 125 in determining its position. For example, cell tower 130 can transmit to user device 125 assistance data including any or all of the current time, the position of one or more satellites, clock offset data for the one or more satellites, and an estimate of the location of user device 125 based on, for example, the location of one or more of the wireless communication towers. In some other implementations, a wireless communication tower can estimate the position of the user device 125 either alone or in combination with one or more other wireless communication towers, e.g., through signal strength observations or time-of-flight and/or angle-of-arrival calculations using signals transmitted by the user device 125. The wireless communication towers can utilizes one or more of the communication standards or protocols discussed above (e.g., GSM, LTE, WiMAX, WiFi, or the like).

Similarly, the user device 125 can obtain assistance in determining its location from a wireless local area network (WLAN) device, such as Wi-Fi access point 145. For example, Wi-Fi access point 145 can provide user device 125 with an estimate of its location when user device 125 is located indoors where signals from positioning satellites are significantly attenuated. In some implementations, Wi-Fi access point 145 can report its position, which can be adopted or utilized by the user device 125 to determine its own position. In some other implementations, Wi-Fi access point 145 can estimate the position of the user device 125, either alone or in combination with one or more other Wi-Fi access points, e.g., through signal strength observations or time-of-flight and/or angle of arrival calculations using signals transmitted by the user device 125. Additionally or alternatively, the user device 125 can augment its position determination using other location determination techniques, such as RF fingerprinting based on the strength of received signals at one or more locations and/or through time of flight measurements from one or more Wi-Fi access points and/or through dead reckoning based on input from one or more sensors, e.g., an accelerometer and/or a gyroscope.

Exemplary GNSS Enabled User Device

Figure 2:
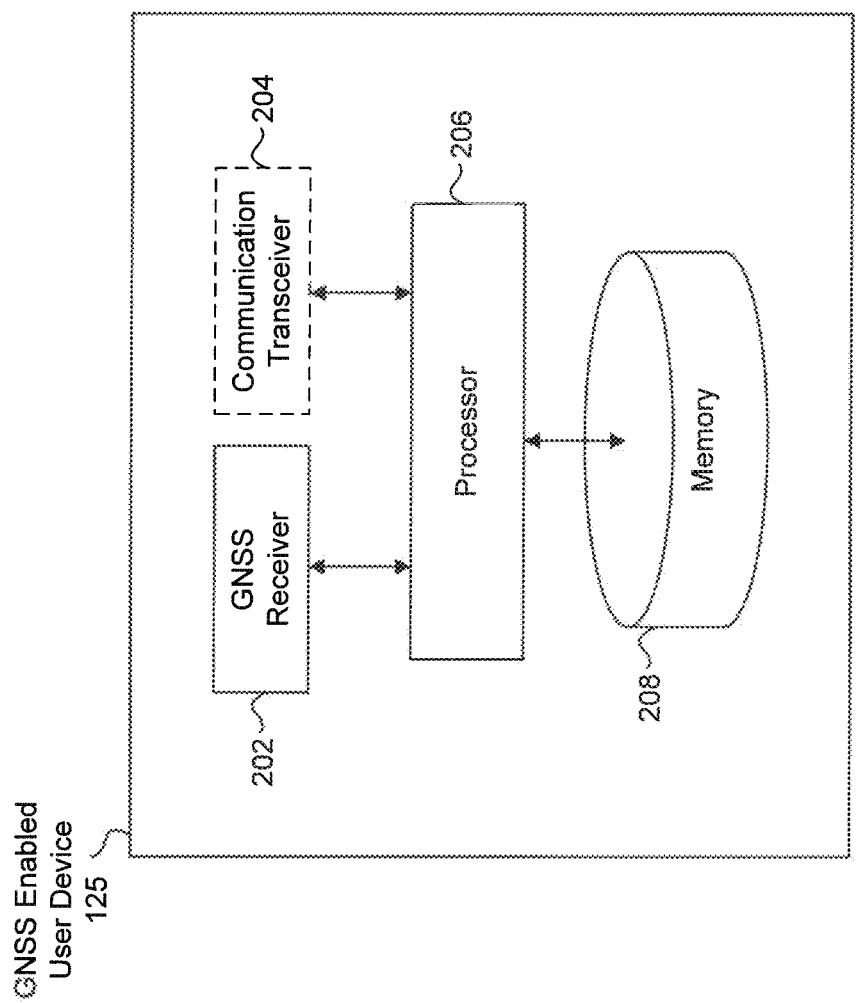
FIG. 2 illustrate a block diagram of an exemplary a GNSS enabled user device in accordance with exemplary embodiments of the present disclosure.

FIG. 2 illustrates a block diagram of an exemplary GNSS enabled user device 125 according to an exemplary embodiment of the present disclosure. The user device 125 includes suitable logic, circuitry, and/or code that is configured to determine the location of the user device 125 in response to signals from one or more sources. For example, the user device 125 can be configured to determine its position from GNSS signals received from one or more positioning satellites (e.g., positioning satellites 105, 110, 115, and 120). In an exemplary embodiment, the user device 125 is configured to differentiate between direct GNSS signals received from one or more positioning satellites and reflected GNSS signals received from the one or more positioning satellites by utilizing one or more three-dimensional (3D) models of the terrain at the location of, and/or in the proximity of, the user device 125. Herein, "terrain" includes buildings or any other obstruction that may prevent, hamper and/or otherwise obstruct direct GNSS signal reception. For example, the 3D terrain model may be a model of 3D representations of buildings within an urban environment. In this case, the 3D models of the terrain may be referred to as, for example, 3D building models, 3D city models, 3D urban models, or the like. In more rural environments, in which it may be more likely that an obstruction will be, for example, trees, geographic formations (e.g., hills, mountains, boulders, canyon walls, etc.) and/or other natural structures, the 3D models of the terrain may be referred to as, for example, 3D geographical models, 3D topographical models, 3D rural models, or the like.

For the purposes of this disclosure, and as would be appreciated by those skilled in the relevant art(s), references to a 3D terrain model, a 3D model of the terrain, and/or any other reference to a 3D model can include, for example, 3D models of buildings and/or any other man-made structures, 3D models of geographic formations and/or any other natural structures, and/or any other 3D models of man-made and/or natural structures that may prevent, hamper and/or otherwise obstruct a signal path between a GNSS enabled device and a positioning satellite.

The user device 125 can include a GNSS receiver 202, a processor 206, and a memory 208. In an exemplary embodiment, the user device 125 can also include a communication transceiver 204 that includes suitable logic, circuitry, and/or code that is configured to transmit and/or receive radio signals over the communication network 130.

The GNSS receiver 202 includes suitable logic, circuitry, and/or code that is configured to receive GNSS signals from a plurality of visible GNSS satellites. The received GNSS signals may include direct signals and/or reflected signals. As discussed above, direct signals refer to GNSS signals received from one or more visible orbiting satellites with a direct line of sight to the GNSS receiver 202. Reflected signals refer to GNSS signals received from one or more visible orbiting satellites not within the direct line of sight of the GNSS receiver 202 that have been reflected by the terrain (i.e., buildings, trees, geography, and/or any other obstructions) before reaching the GNSS receiver 202. As will be understood by those of ordinary skill in the relevant art(s), although the reflected GNSS signals can be used in the calculation of a navigation solution, the reflected GNSS signals may introduce inaccuracies in the calculation of the navigation solution due to the extra path length of the reflected GNSS signals.

The received GNSS signals can include satellite navigation information such as ephemeris and/or clock models to provide some examples. The satellite navigation information can be utilized in determining related satellite orbits (e.g., one or more orbital models of the positioning satellites) and calculating a navigation solution such as, for example, a position fix and/or velocity of the GNSS receiver 202. The GNSS receiver 202 can be configured to use available ephemeris, such as present broadcast ephemeris, historic broadcast ephemeris, and/or GNSS almanac data, in determining the related satellite orbits and calculating a navigation solution.

The processor 206 includes suitable logic, circuitry, and/or code that is configured to control overall operation and/or configuration of the user device 125 and to process GNSS signals from the GNSS receiver 202 to calculate a navigation solution, such as a position fix and/or velocity of the user device 125. In exemplary embodiments in which the user device 125 includes communication transceiver 204, the processor 206 is also configured to process communication signals transmitted/received by the communication transceiver 204 via the telecommunication network 130 to calculate a navigation solution and/or to assist in the calculation of the navigation solution calculated using the GNSS signals.

In an exemplary embodiment, the processor 206 can be configured to process the GNSS signals received from the GNSS receiver 202 utilizing one or more three-dimensional (3D) models of the terrain at the location of, and/or in the proximity of, the user device 125 to differentiate between direct GNSS signals and reflected GNSS signals received from the one or more positioning satellites.

Using satellite navigation information determined from a last-known position fix of the user device 125, the processor 206 can calculate the orbital paths and/or positions of positioning satellites (e.g., an orbital model). Using the calculated orbital paths and/or positions of the positioning satellites and one or more 3D models, the processor 206 can determine which positioning satellites will have a direct line of sight of the GNSS receiver 202 while taking the current terrain (e.g., buildings, trees, geography, and/or any other obstructions) into consideration. For example, the processor 206 can determine which of the received GNSS signals are capable of being received along a direct signal path by determining which positioning satellites have a direct line-of-sight path to GNSS receiver 202 considering the current terrain. In this case, the GNSS signals received from these positioning satellites will be identified as direct GNSS signals. Similarly, the processor 206 can determine which of the received GNSS signals originated from positioning satellites that, based on the current terrain, do not have a direct line-of-sight path to the GNSS receiver 202. Here, any GNSS signals received from these positioning satellites will be identified as reflected GNSS signals.

That is, the processor 206 can determine if the received GNSS signals have been transmitted from positioning satellites with a direct line of sight to the GNSS receiver 202 or, because of the terrain, if the received GNSS signals have been transmitted from positioning satellites without a direct line of sight to the GNSS receiver 202, thereby resulting in GNSS signals that include at least one reflected component. Here, the identification utilizes the one or more 3D terrain models to determine the composition of the signal path of each of the received signals—a direct signal path or a signal path that includes at least one reflected signal path component. Further, the processor 206 can be configured to identify the positioning satellites from which the received GNSS signals originated based on identification (ID) information associated with the received GNSS signals (e.g., ID information contained within the received signals) and/or the frequencies of the received signals, to provide some examples. In the case of frequency identification, the positioning satellites can transmit at unique frequencies so that the positioning satellites may be identified by the frequencies of the received GNSS signals. By identifying the particular satellite from which the GNSS signal was received, the processor 206 can determine if the GNSS signal has been reflected by determining if the signal path between the user device 125 and the particular satellite is obstructed based on its knowledge of the current terrain.

In an exemplary embodiment, to differentiate between direct GNSS signals and reflected GNSS signals, the processor 206 can be configured to utilize one or more 3D models of the terrain and generated directional vectors between the user device 125 and each of the positioning satellites. For example, the processor 206 can determine a last-known position fix of the user device 125 and/or an approximate position fix utilizing, for example, A-GPS and/or one or more wireless access points as described earlier herein. Using satellite navigation information determined from the last known and/or approximate position fix, the processor 206 can calculate orbital models (e.g., orbital paths and/or positions) of positioning satellites. The processor 206 can then calculate a directional vector between the last known and/or approximate position fix of the user device 125 and each of the positioning satellites using the orbital models of the satellites. The processor 206 can then compare each of the directional vectors with the one or more 3D terrain models to determine if the directional vectors intersect with any obstruction (e.g., buildings, trees, geography, and/or any other obstruction) of the terrain that may block and/or hinder direct line-of-sight signal propagation between corresponding positioning satellites and the user device 125. The processor 206 can then associate the comparison results with each of the positioning satellites to identify which of the positioning satellites will provide, or will likely provide reflected signals.

Following identification of the positioning satellites from which the GNSS signals originated (and thereby the determination of the direct/reflected status of the signals), the processor 206 can calculate a navigation solution (e.g., a position fix, velocity, etc. of the user device 125) utilizing direct signals, reflected signals, or a combination of direct and reflected signals.

In an exemplary embodiment, the processor 206 is configured to omit reflected GNSS signals in the calculation of a navigation solution. By omitting the reflected GNSS signals and utilizing only direct GNSS signals, the navigation solution calculated by the processor 206 can have reduced and/or minimized inaccuracies that may be introduced due to the extra path length of the reflected GNSS signals.

Figure 4:
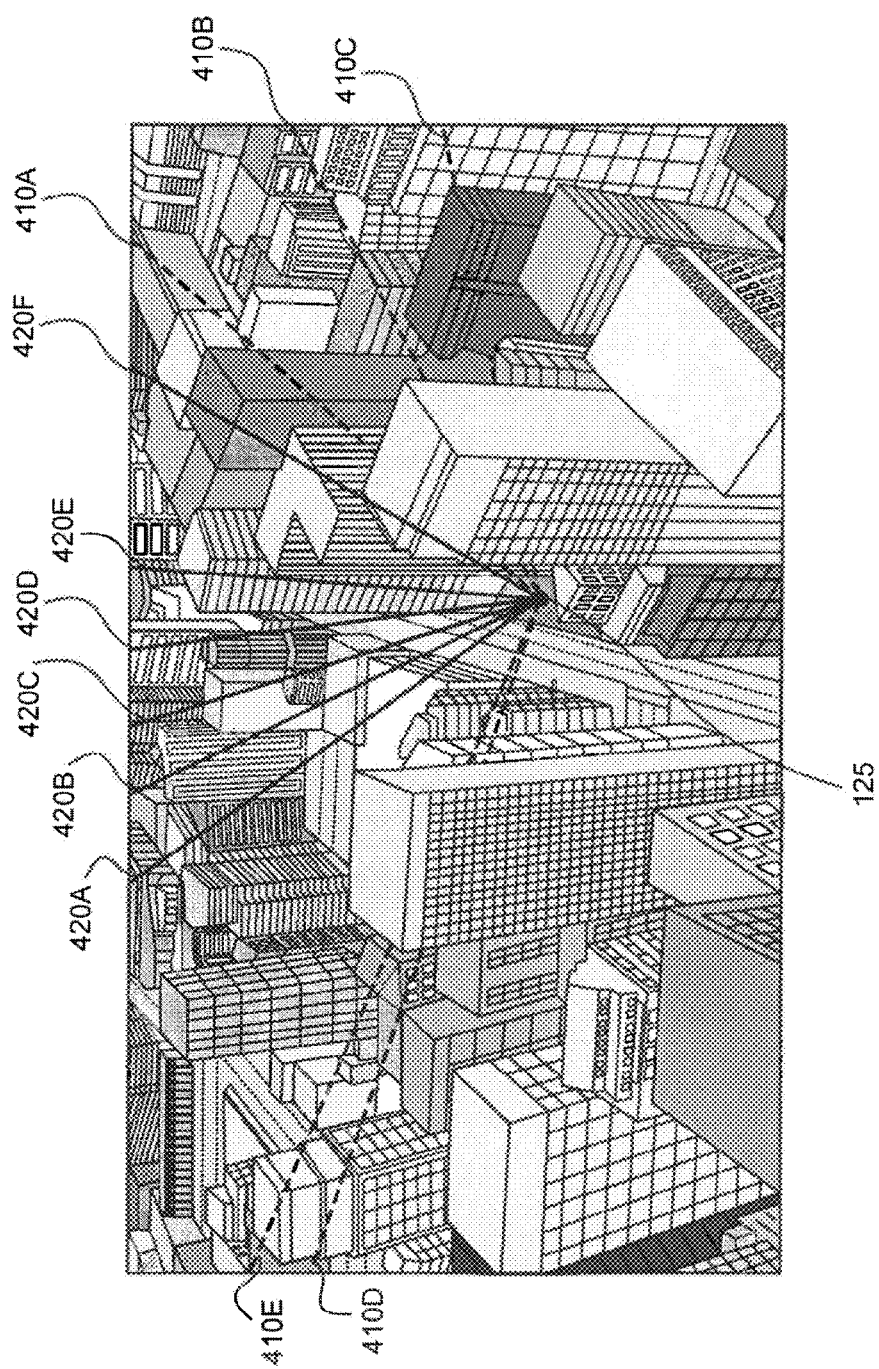
FIG. 4 illustrates a three-dimensional (3D) terrain model in accordance with exemplary embodiments of the present disclosure.

For example, with reference to FIG. 4, the GNSS receiver 202 can receive various GNSS signals, including direct GNSS signals 420A-F and reflected signals 410A-E. The processor 206 can identify the reflected signals 410 utilizing one or more 3D terrain models by determining the positioning satellites that do not have a direct line-of-sight path to the GNSS receiver 202 based on the terrain at the location of, and/or in the proximity of, the user device 125.

In an exemplary embodiment, the processor 206 can be configured to utilize only reflected GNSS signals or a combination of direct GNSS signals and reflected GNSS signals in the calculation of a navigation solution. To compensate for inaccuracies that may be introduced due to the reflected GNSS signals, the processor 206 can be configured to weight the reflected GNSS signals used in the calculation of the navigation solution. For example, the reflected GNSS signals can be multiplied by a weight factor that is, for example, less than one, when compared to that of any direct GNSS signal(s) that are present. Therefore, any inaccuracies introduced by the reflected GNSS signals will be reduced by the weight factor.

In an exemplary embodiment, Doppler measurements can be used in the weighting operation. Here, the weighting of GNSS signals can be a function of the dot product between the velocity of the user device 125 and the vector towards the particular positioning satellite. For example, the closer the velocity of the user device 125 and the vector towards the positioning satellite are to being orthogonal, the less expected reflection error is introduced into the Doppler measurements. Conversely, the farther the velocity of the user device 125 and the vector towards the positioning satellite are to being orthogonal, the greater expected reflection error is introduced in the Doppler measurements. Therefore, by weighting the GNSS signals as a function of the dot-product between the velocity of use device 125 and the vector towards the positioning satellite, the varying degree of reflection error can be compensated for during Doppler measurements.

In an exemplary embodiment, the processor 206 can be configured to analyze the quality of each of the received GNSS signals and to utilize the quality information in determining the combination of direct and reflected GNSS signals to be utilized in the calculation of a navigation solution. Typically, direct GNSS signals provide a more accurate calculation of a navigation solution. However, although reflected GNSS signals may introduce inaccuracies, if one or more reflected GNSS signals is of better quality than one or more received direct GNSS signal, the processor 206 can utilize the one or more reflected GNSS signal in the calculation of a navigation solution rather than the one or more direct GNSS signals.

The memory 208 includes suitable logic, circuitry, and/or code that is configured to store information such as executable instructions and/or data that may be utilized by the processor 206 to perform the navigation functionality described herein. The memory 208 may include read only memory (ROM), random access memory (RAM), magnetic disk storage media, optical storage media, and/or flash memory to provide some examples. In an exemplary embodiment, the memory 208 is configured to store the one or more 3D models of the terrain.

In an exemplary embodiment, and as discussed in more detail with reference to FIG. 3, the GNSS receiver 202 can be configured to process received GNSS signals utilizing one or more three-dimensional (3D) models of the terrain at the location of, and/or in the proximity of, the user device 125 to differentiate between direct GNSS signals and reflected GNSS signals received from the one or more positioning satellites. That is, the GNSS receiver 202 can be configured to process the received GNSS signals in a similar manner as discussed above with respect to the processor 206. For example, the GNSS receiver 202, the processor 206, or a combination of both the GNSS receiver 202 and the processor 206 can be configured to process the received GNSS signals as described herein.

Exemplary GNSS Receiver

Figure 3:
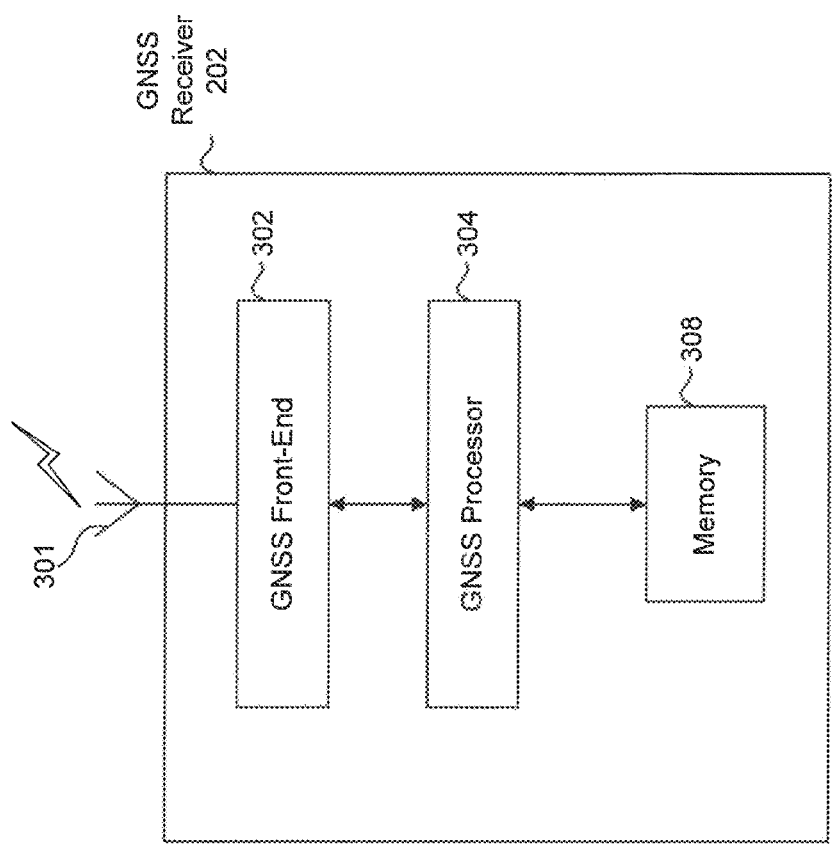
FIG. 3 illustrates a communication platform in accordance with exemplary embodiments of the present disclosure.

FIG. 3 illustrates a block diagram of the GNSS receiver 202 according to an exemplary embodiment of the present disclosure. The GNSS receiver 202 includes suitable logic, circuitry, and/or code that is configured to receive GNSS signals from a plurality of visible GNSS satellites and to process the received GNSS signals utilizing one or more three-dimensional (3D) models of the terrain at the location of, and/or in the proximity of, the GNSS receiver 202 to differentiate between direct GNSS signals and reflected GNSS signals received from the one or more positioning satellites. It should be appreciated that the GNSS receiver 202 can be a standalone device or can be implemented in another device, for example, user device 125. The GNSS receiver 202 can include a GNSS antenna 301, a GNSS front-end 302, a GNSS processor 304, and a memory 308.

The GNSS antenna 301 includes suitable logic, circuitry, and/or code that can be configured to receive GNSS signals from a plurality of visible positioning satellites. The received GNSS signals may include direct signals and/or reflected signals. As discussed above, direct signals refer to GNSS signals received from one or more visible orbiting satellites with a direct line of sight to the GNSS receiver 202. Reflected signals refer to GNSS signals received from one or more visible orbiting satellites not within the direct line of sight of the GNSS receiver 202 that have been reflected by the terrain before reaching the GNSS receiver 202. Those skilled in the relevant art(s) will recognize that the GNSS antenna 301 may include an integer array of antennas. The GNSS antenna 301 can be configured to communicate the received GNSS signals to the GNSS front-end 302 for further processing.

The received GNSS signals can include satellite navigation information such as ephemeris, clock models, and/or GNSS almanac data to provide some examples. The satellite navigation information can be utilized in determining related satellite orbits and calculating a navigation solution such as, for example, a position fix and/or velocity of the GNSS receiver 202. The GNSS processor 304 can be configured to use available ephemeris, such as present broadcast ephemeris, historic broadcast ephemeris, and/or GNSS almanac data, in determining the satellite orbits and navigation solution.

The GNSS front-end 302 includes suitable logic, circuitry, and/or code that can be configured convert the received GNSS signals to GNSS baseband signals, which may be suitable for further processing in the GNSS processor 304 for calculating a navigation solution. Although not shown in FIG. 3, those skilled in the relevant art(s) will understand that the GNNS front-end 302 can be configured to communicate the GNSS baseband signals to the processor 206 (FIG. 2) for further processing by the processor 206 in exemplary embodiments in which the processor 206 performs some or all of the processing of received GNSS signals.

The GNSS processor 304 includes suitable logic, circuitry, and/or code that can be configured to control overall operation and/or configuration of the GNSS receiver 202 and to process GNSS baseband signals from the GNSS front-end 302 so as to calculate a navigation solution, such as a position fix and/or velocity of the GNSS receiver 202. The GNSS processor 304 can be configured to extract ephemeris comprising satellite navigational information from the GNSS baseband signals. The GNSS processor 304 can also be configured to communicate with the memory 308 to store and/or retrieve calculated navigation solutions, ephemeris, long-term orbits (LTO) data, A-GPS data, and/or GNSS almanac data to/from the memory 308.

In an exemplary embodiment, the GNSS processor 304 can be configured to process the GNSS baseband signals received from the GNSS front-end 302 utilizing one or more three-dimensional (3D) models of the terrain to differentiate between direct GNSS signals and reflected GNSS signals received from the one or more positioning satellites.

Using satellite navigation information determined from a last-known position fix of the GNSS receiver 202 and/or an approximate position fix utilizing, for example, A-GPS and/or one or more wireless access points as described earlier herein, the GNSS processor 304 can calculate the orbital paths and/or positions of positioning satellites. Using the calculated orbital paths and/or positions of the positioning satellites and one or more 3D terrain models, the GNSS processor 304 can determine which positioning satellites will have a direct line of sight of the GNSS receiver 202 while taking the current terrain (e.g., buildings, trees, geography, and/or any other obstructions) into consideration. For example, the GNSS processor 304 can determine Which of the received GNSS signals are capable of being received along a direct signal path by determining which positioning satellites have a direct line-of-sight path to GNSS receiver 202 considering the current terrain. In this case, the GNSS signals received from these positioning satellites will be identified as direct GNSS signals. Similarly, the GNSS processor 304 can determine which of the received GNSS signals originated from positioning satellites that, based on the current terrain geography, do not have a direct line-of-sight path to the GNSS receiver 202. Here, the GNSS signals received from these positioning satellites will be identified as reflected GNSS signals.

That is, the GNSS processor 304 can determine if the received GNSS signals have been transmitted from positioning satellites with a direct line of sight to the GNSS receiver 202 or, because of the terrain, if the received GNSS signals have been transmitted from positioning satellites without a direct line of sight to the GNSS receiver 202, thereby resulting in GNSS signals that include at least one reflected component. Here, the identification process utilizes the one or more 3D terrain models to determine the composition of the signal path of each of the received signals—a direct signal path or a signal path that includes at least one reflected signal path component. Further, the GNSS processor 304 can be configured to identify the positioning satellites from which the received GNSS signals originated based on identification (ID) information associated with the received GNSS signals (e.g., ID information contained within the received signals) and/or the frequencies of the received signals, to provide some examples. In the case of frequency identification, the positioning satellites can transmit at unique frequencies so that each of the positioning satellites may be identified by the frequency of each of the received GNSS signals. By identifying the particular satellite from which the GNSS signal was received, the processor 206 can determine if the GNSS signal has been reflected by determining if the signal path between the user device 125 and the particular satellite is obstructed based on the current terrain.

In an exemplary embodiment, to differentiate between direct GNSS signals and reflected GNSS signals, the GNSS processor 304 can be configured to utilize one or more 3D models of the terrain and generated directional vectors between the GNSS receiver 202 and each of the positioning satellites. For example, the GNSS processor 304 can determine a last-known position fix of the GNSS receiver 202 and/or an approximate position fix utilizing, for example, A-GPS and/or one or more wireless access points as described earlier herein. Using satellite navigation information determined from the last known and/or approximate position fix, the GNSS processor 304 can calculate orbital models (e.g., orbital paths and/or positions) of positioning satellites. The GNSS processor 304 can then calculate a directional vector between the last known and/or approximate position fix of the GNSS receiver 202 and each of the positioning satellites using the orbital models of the satellites. The GNSS processor 304 can then compare each of the directional vectors with the one or more 3D terrain models to determine if the directional vectors intersect with any obstruction (e.g., buildings, trees, geography, and/or any other obstruction) of the terrain that may block and/or hinder direct line-of-sight signal propagation between corresponding positioning satellites and the GNSS receiver 202. The GNSS processor 304 can then associate the comparison results with each of the positioning satellites to identify which of the positioning satellites will provide, or will likely provide reflected signals.

Following identification of the positioning satellites from which the received GNSS signals originated (and thereby identifying the direct/reflected status of the GNSS signals), the GNSS processor 304 can calculate a navigation solution (e.g., a position fix, velocity, etc. of the user device 125) utilizing direct signals, reflected signals, or a combination of direct and reflected signals.

In an exemplary embodiment, the GNSS processor 304 is configured to omit reflected GNSS signals in the calculation of a navigation solution. By omitting the reflected GNSS signals and utilizing only direct GNSS signals, the navigation solution calculated by the GNSS processor 304 can reduce and/or minimize inaccuracies that may be introduced due to the extra path length of the reflected GNSS signals.

For example, with reference to FIG. 4, the GNSS receiver 202 can receive various GNSS signals, including direct GNSS signals 420A-F and reflected signals 410A-E. The GNSS processor 304 can identify the reflected signals 410 utilizing one or more 3D terrain models by determining the positioning satellites that do not have a direct line-of-sight path to the GNSS receiver 202 based on the terrain at the location of and/or in the proximity of, the GNSS receiver 202.

In an exemplary embodiment, the GNSS processor 304 can be configured to utilize only reflected GNSS signals or a combination of direct GNSS signals and reflected GNSS signals in the calculation of a navigation solution. To compensate for inaccuracies that may be introduced due to the reflected GNSS signals, the GNSS processor 304 can be configured to weight the reflected GNSS signals used in the calculation of the navigation solution. For example, the reflected GNSS signals can be multiplied by a weight factor that is, for example, less than one, when compared to the direct signals. Therefore, any inaccuracies introduced by the reflected GNSS signals will be reduced by the weight factor.

In an exemplary embodiment, Doppler measurements can be used in the weighting operation. Here, the weighting of GNSS signals can be a function of the dot-product between the velocity of GNSS receiver 202 and the vector towards the particular positioning satellite. For example, the closer the velocity of the GNSS receiver 202 and the vector towards the positioning satellite are to being orthogonal, the less expected reflection error is introduced into the Doppler measurements. Conversely, the farther the velocity of the GNSS receiver 202 and the vector towards the positioning satellite are to being orthogonal, the greater expected reflection error is introduced in the Doppler measurements. Therefore, by weighting the GNSS signals as a function of the dot-product between the velocity of GNSS receiver 202 and the vector towards the positioning satellite, the varying degree of reflection error can be compensated for during Doppler measurements.

In an exemplary embodiment, the GNSS processor 304 can be configured to analyze the quality of each of the received GNSS signals and to utilize the quality information in determining the combination of direct and reflected GNSS signals to be utilized in the calculation of a navigation solution. Typically, direct GNSS signals provide a more accurate calculation of a navigation solution. However, although reflected GNSS signals may introduce inaccuracies, if one or more reflected GNSS signals is of better quality than one or more received direct GNSS signals, the GNSS processor 304 can utilize the one or more reflected GNSS signal in the calculation of a navigation solution rather than the one or more direct GNSS signals, The memory 308 includes suitable logic, circuitry, and/or code that is configured to store information such as executable instructions and/or data that may be utilized by the GNSS processor 304, including satellite navigation information such as ephemeris, clock models, and/or GNSS almanac data to provide some examples. The satellite navigation information can be utilized in determining related satellite orbits and calculating a navigation solution such as, for example, a position fix and/or velocity of the GNSS receiver 302. The GNSS processor 304 can be configured to use available ephemeris, such as present broadcast ephemeris, historic broadcast ephemeris, and/or GNSS almanac data, in determining the related satellite orbits and calculating a navigation solution. The executable instructions can include algorithms utilized to calculate a position fix of the GNSS receiver 302 using fresh ephemeris provided by the memory 308. The memory 308 may include read only memory (ROM), random access memory (RAM), magnetic disk storage media, optical storage media, and/or flash memory to provide some examples. In an exemplary embodiment, the memory 308 is configured to store the one or more 3D models of the terrain.

Exemplary 3D Terrain Model

As discussed above, FIG. 4 illustrates an exemplary 3D terrain model in accordance with exemplary embodiments of the present disclosure. In operation, the user device 125 can receive various GNSS signals from a plurality of positioning satellites (e.g., positioning satellites 105, 110, 115, and 120). The received GNSS signals can originate from positioning satellites having a direct line of sight to the user device 125 (e.g., direct GNSS signals 420A-F) and/or from positioning satellites not within the direct line of sight of the user device 125 that have been reflected by the terrain before reaching the user device 125 (e.g. reflected GNSS signals 410A-E). Although the reflected GNSS signals 410 have been reflected prior to reaching the user device 125, the reflected signals 410 are of sufficient magnitude to be utilized in position and navigational determinations by the user device 125.

GNSS signals received by the user device 125 can be processed by the user device 125 to differentiate between the reflected GNSS signals 410 and direct GNSS signals 420. For example, the positioning satellites from which the received GNSS signals have originated can be identified based on identification (ID) information associated with the received signals (e.g., ID information contained within the received signals) and/or the frequencies of the received signals, to provide some examples. In the case of frequency identification, the positioning satellites can transmit at unique frequencies so that the positioning satellites may be identified by the frequencies of the received GNSS signals.

The user device 125 can utilize one or more 3D terrain models to determine which of the positional satellites have a direct line-of-sight path to the user device 125 based on the terrain at the location of, and/or in the proximity of, the user device 125. That is, the user device 125 can determine if a vector from the user device 125 to each of the positioning satellites intersect with the terrain (e.g., a building, tree, obstruction, etc.) utilizing one or more 3D terrain models. Based on this line-of-sight determination, the user device 125 can differentiate between the reflected GNSS signals 410 and direct GNSS signals 420 upon identification of the positioning satellites from which the received GNSS signals originated. That is, if the line-of-sight path (e.g., vector from the user device 125 to positioning satellite) is not a direct path (e.g., the vector intersects the terrain), GNSS signals received from such positioning satellites can be identified as reflected signals, and therefore not line of sight.

Following the differentiation of the received GNSS signals, the user device 125 can be configured to process the signals to determine a navigation solution. As discussed above, the user device 125 can be configured to utilize a combination of reflected GNSS signals 410 and direct GNSS signals 420 in the calculation of a navigation solution. That is, the user device 125 can process direct GNSS signals 420, reflected GNSS signals 410, or a combination of both, to determine a navigation solution. The user device 125 can select some or all of these various signals for navigation solution calculations based on, for example, the line-of-sight status of the signals (e.g., reflected vs, direct), strength of the signals, and/or quality of the signals to provide some examples.

It should be appreciated by those of ordinary skill in the relevant art(s) that the discussion of the operation of the user device 125 with reference to FIG. 4 can be performed in a similar manner by the GNSS receiver 202 discussed above with reference to FIG. 3.

Figure 5:
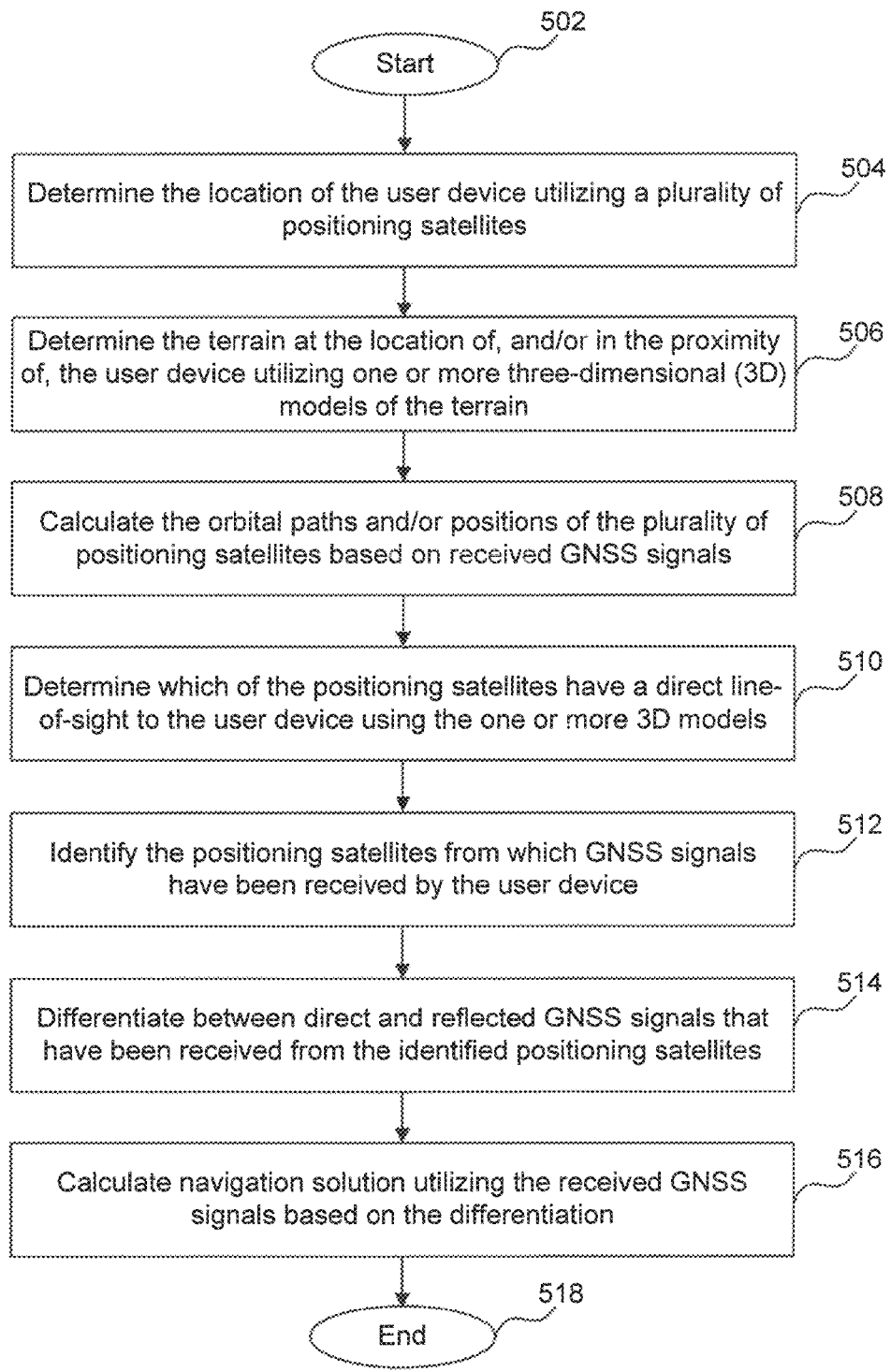
FIG. 5 illustrates a method of GNSS signal processing in accordance with an exemplary embodiment of the present disclosure.

FIG. 5 illustrates a flowchart 500 of a method of GNSS signal processing in an exemplary embodiment of the present disclosure. The method of flowchart 500 is described with continued reference to FIGS. 1-4. The steps of the method of flowchart 500 are not limited to the order described below, and the various steps may be performed in a different order. Further, two or more steps of the method of flowchart 500 may be performed simultaneously with each other.

The method of flowchart 500 begins at step 502 and transitions to step 504, where the user device 125 determines the location of the user device 125 utilizing the plurality of positioning satellites (e.g., positioning satellites 105, 110, 115, and 120). For example, the GNSS receiver 202 can be configured to receive GNSS signals from a plurality of the positioning satellites and provided the received GNSS signals to processor 206. The processor 206 can be configured to process the GNSS signals to calculate a navigation solution, such as a position fix and/or velocity of the user device 125. Even if the exact position fix is not known, an estimated position can be used based on a previously known position, A-GPS, and/or one or more wireless access points, as described earlier herein. For example, by knowing the location of an assigned cell tower and the current signal strength, a position estimate may be determined.

After step 504, the flowchart 500 transitions to step 506, where the user device 125 can determine the terrain at the location of, and/or in the proximity of, the user device 125 utilizing one or more three-dimensional (3D) terrain models.

For example, using one or more 3D terrain models, the user device 125 can determine any obstructions (e.g., buildings, trees, geography, and/or any other obstructions) that may obstruct the signal paths from the plurality of positioning satellites to the user device 125.

After step 506, the flowchart 500 transitions to step 508, where the user device 125 can calculate the orbital paths and/or positions of the plurality of positioning satellites. For example, the processor 206 can calculate the orbital paths and/or positions of the positioning satellites using the satellite navigation information included in the previously received GNSS signals. As discussed above, the received GNSS signals can include satellite navigation information such as ephemeris and/or clock models to provide some examples. The satellite navigation information can be utilized in determining the satellite orbits and/or positions of the positioning satellites, and in determining a navigation solution such as, for example, a position fix and/or velocity of the of the user device 125.

After step 508, the flowchart 500 transitions to step 510, where the user device 125 can determine which of the positioning satellites have a direct line-of-sight to the user device 125 based on the determined terrain at the location of, and/or in the proximity of, the user device 125 and the determined orbital paths and/or positions of the positioning satellites. For example, a directional vector between the initial approximate position of the user device 125 to each positional satellite can be calculated using the orbital models of the satellites. After which, the directional vector is compared to the 3D terrain model of the approximate user device location, to determine if the vector intersects with any obstruction (e.g., building, mountain, etc.) that may preclude direct line-of-sight signal propagation between the satellite and the user device 125.

After step 510, the flowchart 500 transitions to step 512, where the user device 125 can identify the positioning satellites from which GNSS signals have been received. For example, the user device 125 can identify the originating satellites based on identification (ID) information associated with the received GNSS signals (e.g., ID information contained within the received signals) and/or the frequencies of the received GNSS signals, to provide some examples.

After step 512, the flowchart 500 transitions to step 514, where the user device 125 can differentiate between direct and reflected received GNSS signals utilizing the determined identity of the positioning satellites from which the GNSS signals have been received and the determination of whether the identified positioning satellites have a direct line-of-sight signal propagation to the user device 125 when considering the terrain.

After step 514, the flowchart 500 transitions to step 516, where the user device 125 can calculate a navigation solution (e.g., a position fix, velocity, etc.) utilizing direct signals, reflected signals, or a combination of direct and reflected signals. For example, the user device 125 can select some or all of these various GNSS signals for navigation solution calculations based on the line-of-sight status of the signals (e.g., reflected vs. direct), strength of the signals, and/or quality of the signals to provide some examples. As discussed herein, this may include weighting any reflected signals with a percentage less than 1 compared with line-of-sight signals. In other words, reflected signals may be discounted in the navigation solution calculation, because they are generally less reliable for position determination than line-of-sight signals.

After step 516, the flowchart 500 transitions to step 518, where the flowchart ends.

It should be appreciated by those of ordinary skill in the relevant art(s) that the discussion of the method of GNSS signal processing with reference to the user device 125 is similarly applicable to the GNSS receiver 202 discussed above with reference to FIG. 3.

Figure 6:
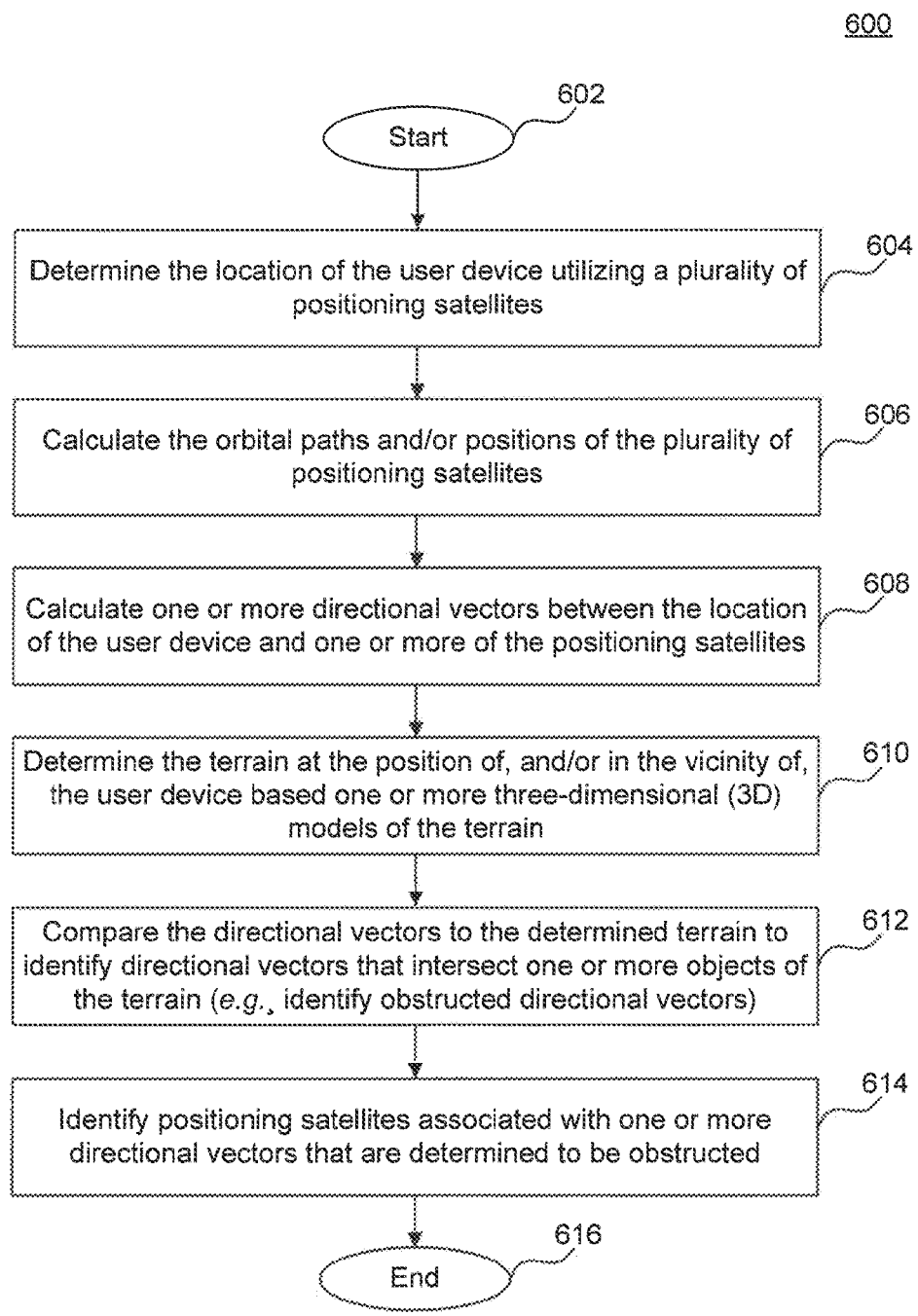
FIG. 6 illustrates a method of GNSS signal processing in accordance with an exemplary embodiment of the present disclosure.

FIG. 6 illustrates a flowchart 600 of a method of GNSS signal processing in an exemplary embodiment of the present disclosure. The method of flowchart 600 is described with continued reference to FIGS. 1-4. The steps of the method of flowchart 600 are not limited to the order described below, and the various steps may be performed in a different order. Further, two or more steps of the method of flowchart 600 may be performed simultaneously with each other.

The method of flowchart 600 begins at step 602 and transitions to step 604, where the user device 125 determines the location of the user device 125 utilizing the plurality of positioning satellites (e.g., positioning satellites 105, 110, 115, and 120). For example, the GNSS receiver 202 can be configured to receive GNSS signals from a plurality of the positioning satellites and provided the received GNSS signals to processor 206. The processor 206 can be configured to process the GNSS signals to calculate a navigation solution, such as a position fix and/or velocity of the user device 125. Even if the exact position fix is not known, an estimated position can be used based on a previously known position, A-GPS, and/or one or more wireless access points, as described earlier herein. For example, by knowing the location of an assigned cell tower and the current signal strength, a position estimate may be determined.

After step 604, the flowchart 600 transitions to step 606, where the user device 125 calculates the orbital paths and/or positions of the plurality of positioning satellites. For example, the processor 206 can calculate the orbital paths and/or positions of the positioning satellites using the satellite navigation information included in the previously received GNSS signals. As discussed above, the received GNSS signals can include satellite navigation information such as ephemeris and/or clock models to provide some examples. The satellite navigation information can be utilized in determining the satellite orbits and/or positions of the positioning satellites, and in determining a navigation solution such as, for example, a position fix and/or velocity of the of the user device 125.

After step 606, the flowchart 600 transitions to step 608, where the user device 125 calculates directional vectors between the location (and/or approximate location) of the user device 125 and the positions of each of the positional satellites.

After step 608, the flowchart 600 transitions to step 610, where the user device 125 determines the terrain at the location (and/or approximate location) of the user device 125 utilizing one or more three-dimensional (3D) terrain models.

After step 610, the flowchart 600 transitions to step 612, where the user device 125 compares the directional vectors to the terrain determined using one or more 3D terrain models. Based on these comparisons, the user device 125 identifies which of the directional vectors intersect one or more objects (e.g., man-made and/or natural objects) of the terrain that are provided in the 3D terrain model(s). That is, the user device 125 identifies which of the directional vectors are obstructed by one or more objects of the terrain (e.g., identifies obstructed directional vectors). For example, the user device 125 can determine if a vector from the user device 125 to each of the positioning satellites intersect with the terrain (e.g., a building in urban environment, or a natural obstruction in a rural environment) utilizing one or more 3D terrain models.

After step 612, the flowchart 600 transitions to step 614, where the user device 125 identifies positioning satellites that are associated with one or more directional vectors that have been determined to be obstructed. That is, the user device 125 identifies which positioning satellites do not have a direct signal path to the user device 125 (e.g., identifies which satellites are obstructed satellites). Based on this identification, the user device 125 associates GNSS signals received from obstructed positioning satellites as reflected GNSS signals. The user device 125 can then determine a navigation solution a position fix, velocity, etc.) taking the obstructed satellites into consideration.

After step 614, the flowchart 600 transitions to step 616, where the flowchart ends.

It should be appreciated by those of ordinary skill in the relevant art(s) that the discussion of the method of GNSS signal processing with reference to the user device 125 is similarly applicable to the GNSS receiver 202 discussed above with reference to FIG. 3.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely tier convenience and that such actions in fact results from computing devices, processors, controllers, or other devices executing the firmware, software, routines, instructions, etc. Further, any of the implementation variations may be carried out by a general purpose computer.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and are not intended to limit the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A global navigation satellite systems (GNSS) enabled device, comprising:
 a GNSS receiver configured to receive GNSS signals from a plurality of satellites, the received GNSS signals including reflected GNSS signals and direct GNSS signals; and
 a processor configured to:
  differentiate between the reflected GNSS signals and the direct GNSS signals; and
  generate a navigation solution for the GNSS enabled device based on both the reflected GNSS signals and the direct GNSS signals, wherein the reflected GNSS signals are weighted differently from the direct GNSS signals in their respective contribution to the generation of the navigation solution,
  wherein for each reflected GNSS signals, the respective weighting is continuously increased as a velocity of the GNSS enabled device becomes more orthogonal compared to a vector determined from the GNSS enabled device toward a corresponding satellite of the plurality of satellites that originated the reflected GNSS signal.

2. The GNSS enabled device of claim 1, wherein the direct GNSS signals are GNSS signals received via direct signal paths between the GNSS enabled device and corresponding satellites of the plurality of satellites, and wherein the reflected GNSS signals are GNSS signals received via signal paths between the GNSS enabled device and corresponding satellites of the plurality of satellites that each include at least one reflected component.

3. The GNSS enabled device of claim 1, wherein the processor is configured to utilize, in the differentiation between the reflected GNSS signals and the direct GNSS signals, a three-dimensional (3D) terrain model corresponding to a location of the GNSS enabled device or a location proximal to the location of the GNSS enabled device.

4. The GNSS enabled device of claim 3, wherein the processor is configured to determine orbital positions of the plurality of satellites based on the received GNSS signals.

5. The GNSS enabled device of claim 4, wherein the processor is configured to determine, based on the 3D terrain model, if a line of sight between the GNSS enabled device and each of the orbital positions of the plurality of satellites is obstructed.

6. The GNSS enabled device of claim 5, wherein the processor is configured to identify a GNSS signal of the GNSS signals that is received from one of the plurality of satellites as a reflected GNSS signal if the line of sight between the GNSS enabled device and the orbital position of the one of the plurality of satellites is obstructed.

7. The GNSS enabled device of claim 1, wherein the respective weighting for each of the reflected GNSS signals is based on a dot-product of the velocity of the GNSS enabled device and the vector determined from the GNSS enabled device towards the corresponding satellite of the plurality of satellites.

8. A global navigation satellite systems (GNSS) signal processing method, comprising:
receiving GNSS signals from a plurality of satellites at a GNSS enabled device, the received GNSS signals including reflected GNSS signals and direct GNSS signals;
differentiating between the reflected GNSS signals and the direct GNSS signal; and
generating a navigation solution for the GNSS enabled device based on both the reflected GNSS signals and the direct GNSS signals, including differently weighting the reflected GNSS signals and the direct GNSS signals in their respective contribution to the generation of the navigation solution,
wherein the differently weighting the reflected GNSS signals and the direct GNSS signals includes continuously increasing each respective weighting of the reflected GNSS signals as a velocity of the GNSS enabled device becomes more orthogonal compared to a vector determined from the GNSS enabled device toward a corresponding satellite of the plurality of satellites that originated the respective reflected GNSS signal.

9. The method of claim 8, wherein the direct GNSS signals are GNSS signals received via direct signal paths and the reflected GNSS signals are GNSS signals received via signal paths that each includes at least one reflected component.

10. The method of claim 8, wherein the differentiation between the reflected GNSS signals and the direct GNSS signals includes utilizing a three-dimensional (3D) terrain model corresponding to a location of the GNSS enabled device or a location proximal to the location of the GNSS enabled device.

11. The method of claim 10, further comprising:
determining orbital positions of the plurality of satellites based on the received GNSS signals.

12. The method of claim 11, further comprising:
determining which of the plurality of satellites are obstructed satellites by determining which of the plurality of satellites have an obstructed line-of-sight view of the GNSS enabled device based on the 3D terrain model, the determined orbital positions, and the location of the GNSS enabled device.

13. The method of claim 12, further comprising:
identifying each of the plurality of satellites from which the received GNSS signals have originated based on identification information associated with the received GNSS signals.

14. The method of claim 13, wherein the differentiation between the reflected GNSS signals and the direct GNSS signals includes determining that each of the identified GNSS signals that have been received from obstructed satellites are reflected GNSS signals.

15. The method of claim 8, wherein the differently weighting of the reflected GNSS signals is based on a dot-product of the velocity of the GNSS enabled device and the vector determined from the GNSS enabled device towards the corresponding satellite of the plurality of satellites.

16. A global navigation satellite systems (GNSS) enabled device, comprising:
a GNSS receiver configured to receive GNSS signals from a plurality of satellites, the received GNSS signals including reflected GNSS signals and direct GNSS signals; and
a processor configured to:
differentiate between the reflected GNSS signals and the direct GNSS signals; and
generate a navigation solution for the GNSS enabled device based on both the reflected GNSS signals and the direct GNSS signals, wherein the reflected GNSS signals are weighted differently from the direct GNSS signals in their respective contribution to the generation of the navigation solution,
wherein, for each reflected GNSS signal, the respective weighting for the reflected GNSS signal is based on a dot-product of a velocity of the GNSS enabled device and a vector towards a corresponding satellite of the plurality of satellites that originated the reflected GNSS signal.

17. The GNSS enabled device of claim 16, wherein the dot-product provides an indication of an orthogonal relationship between the velocity of the GNSS enabled device and the vector towards the corresponding satellite of the plurality of satellites that originated the reflected GNSS signal.

18. The GNSS enabled device of claim 17, wherein the dot-product represents a varying degree of reflection error present in the reflected GNSS signal that is compensated by the respective weighting of the reflected GNSS signal.

19. The GNSS enabled device of claim 16, wherein the processor is configured to determine orbital positions of the plurality of satellites based on the received GNSS signals.

20. The GNSS enabled device of claim 19, wherein the processor is configured to determine, based on a 3D terrain model, if a line of sight between the GNSS enabled device and each of the orbital positions of the plurality of satellites is obstructed.

* * * * *

UNITED STATES PATENT AND TRADEMARK OFFICE
CERTIFICATE OF CORRECTION

PATENT NO. : 9,562,976 B2
APPLICATION NO. : 14/039496
DATED : February 7, 2017
INVENTOR(S) : Van Diggelen et al.

Page 1 of 1

It is certified that error appears in the above-identified patent and that said Letters Patent is hereby corrected as shown below:

In the Claims

In Column 18, Line 44, replace "GNSS signals" with --GNSS signal--.

Signed and Sealed this
Tenth Day of April, 2018

Andrei Iancu
*Director of the United States Patent and Trademark Office*